United States Patent [19]

Degeilh

[11] Patent Number: 4,652,320

[45] Date of Patent: Mar. 24, 1987

[54] PROCESS FOR MAKING POLYVINYL BUTYRAL GLASS LAMINATES

[75] Inventor: Robert Degeilh, Le Port-Marly, France

[73] Assignee: Saint Gobain Vitrage, Courbevoie, France

[21] Appl. No.: 733,569

[22] Filed: May 13, 1985

Related U.S. Application Data

[62] Division of Ser. No. 467,647, Feb. 18, 1983, Pat. No. 4,533,697.

[30] Foreign Application Priority Data

Feb. 23, 1982 [FR] France ............................. 82 02918

[51] Int. Cl.$^4$ ..................... B32B 17/10; B32B 31/06
[52] U.S. Cl. ............................. 156/99; 156/244.11; 525/61
[58] Field of Search .............. 156/99, 244.11; 525/61

[56] References Cited

U.S. PATENT DOCUMENTS

| | | | |
|---|---|---|---|
| 3,153,009 | 10/1964 | Rombach | 525/61 |
| 4,205,146 | 5/1980 | Hermann et al. | 525/61 |
| 4,230,771 | 10/1980 | Phillips | 525/61 |
| 4,276,351 | 6/1981 | Phillips | 525/61 |
| 4,292,372 | 9/1981 | Moynihan | 525/61 |
| 4,390,594 | 6/1983 | Dages | 525/61 |

FOREIGN PATENT DOCUMENTS 873263 8/1959 United Kingdom .................. 2/6

*Primary Examiner*—Caleb Weston
*Attorney, Agent, or Firm*—Pennie & Edmonds

[57] ABSTRACT

The invention relates to a process for preparing polyvinyl butyral comprising simultaneously introducing into a reaction medium containing a mixture of water and a portion of reactive polyvinyl alcohol, maintained initially at a temperature below about 20° C., a stream of an aqueous solution of polyvinyl alcohol corresponding to the complement of the reactive polyvinyl alcohol and a stream of butyraldehyde and cooling the reaction mixture during the introduction of the polyvinyl alcohol and butyraldehyde. The reaction is also carried out in the presence of an acid catalyst and an emulsifying agent.

The polyvinyl butyral obtained is used, after plasticizing, as an interlayer in laminated glass.

17 Claims, No Drawings

PROCESS FOR MAKING POLYVINYL BUTYRAL GLASS LAMINATES

This is a division of application Ser. No. 467,647, filed Feb. 18, 1983, now U.S. Pat. No. 4,533,697.

TECHNICAL FIELD

The invention relates to a process for preparing polyvinyl butyral and to products produced according to the process.

BACKGROUND OF THE INVENTION

Polyvinyl butyral is generally obtained by a condensation reaction between butyraldehyde and polyvinyl alcohol. By varying the conditions of the reaction, the proportions of the starting materials, the molecular weight of the polyvinyl alcohol, and by incorporating various modification agents and plasticizers, it is possible to vary the properties of the final product to a considerable extent. In the manufacture of laminated glass having at least one sheet of polyvinyl butyral, the desired properties are particularly:

- the compression creep of the polyvinyl butyral sheet;
- the impact resistance of the laminated glass having such a polyvinyl butyral sheet as interlayer;
- the adhesive force of the polyvinyl butyral to the glass sheets of the laminated glass (Pummel test);
- the transparency of the laminated glass, i.e., the absence of cloudiness or turbidity;
- the moisture resistance of the laminated glass.

Some of the known processes for synthesis of polyvinyl butyral make it possible to satisfy one or the other of the above requirements, but not all of them together.

In the published French Pat. No. 2,401,941, a process for preparing polyvinyl butyral was proposed that makes it possible to act at will on one, several or all of the properties listed above, and the resin so prepared is adaptable to the use of plasticizers which are less costly than those which are used when the polyvinyl butyral is prepared in the usual manner.

According to this process, all of the aqueous solution of polyvinyl alcohol, from 8 to 15% by weight, is placed in a reactor, an acid catalyst and an emulsifier are incorporated and butyraldehyde is introduced gradually over a period of 30 minutes while the initial mixture is stirred and the temperature maintained between 5° and 12° C.

After adding butyraldehyde, the resulting mixture is stirred for a period in excess of 30 minutes at a temperature of 8° to 15° C., then the temperature of the mixture is raised to a value between 60° and 80° C. over a period of an hour and a half to four hours. A base is then added into the mixture to raise the pH between 9 and 11 and the temperature is maintained between 60° and 80° C. for a period in excess of a quarter of an hour. The precipitated polyvinyl butyral is separated from the mixture and a very fine powder having a predetermined hydroxyl ratio is obtained.

The polyvinyl butyral sheet, plasticized with an appropriate plasticizer, exhibits the necessary properties, and particularly a satisfactory creep, so that it can be used in laminated glass. Nevertheless, it is desired to improve this creep.

According to French Pat. No. 1,314,959, polyvinyl butyral is produced by simultaneously introducing two streams into a reactor containing water at 90° C. over a period of 75 minutes. Stream 1 is an aqueous solution of polyvinyl alcohol, an acid catalyst, a sequestering agent, and stream 2 is butyraldehyde. A surface-active agent is introduced into the reaction mixture after having added at least 60% of the polyvinyl alcohol and at least 50% of the buyraldehyde and preferably after having finished adding these ingredients and after having brought the temperature of the reaction to between 50° C. and 100° C.

The product obtained after neutralization and separation consists of large grains. These grains are poorly suited to plasticizing and the plasticized sheet is generally cloudy.

DESCRIPTION OF THE INVENTION

This invention relates to a new process having a short, energy-saving reaction cycle that makes it possible to obtain a polyvinyl butyral resin which, in the shape of a plasticized sheet, possesses a high creep and is free of turbidity.

According to the invention, a mixture of water and a portion of the polyvinyl alcohol are introduced into a reactor maintained initially at a temperature lower than 20° C. The amount of the solution is sufficient to allow stirring. Simultaneously and essentially during the same period, a stream comprising an aqueous solution of polyvinyl alcohol containing the remaining amount of the polyvinyl alcohol to be used in the reaction and a stream comprising the butyraldehyde are added. The reaction mixture is cooled during the introduction of the reactants so that the temperature preferably does not exceed about 40° C. The reaction is carried out in the presence of an acid catalyst and an emulsifying agent. The total amounts of polyvinyl alcohol and butyraldehyde are determined as a function of the hydroxyl content desired for the final product, this content generally being on the order of 20% by weight.

According to one aspect of the invention, the simultaneous addition, particularly of the polyvinyl alcohol in an aqueous solution-butyraldehyde feed, is carried out in a reaction mixture containing an excess of polyvinyl alcohol in relation to the theoretical amount necessary to obtain a determined hydroxyl content for the final product, this excess being lower than an amount of polyvinyl alcohol corresponding to about 7.5% by weight of the reaction medium.

The initial reaction medium should contain between about 2.5 and 7.5% by weight of polyvinyl alcohol. Too small a proportion of polyvinyl alcohol can be the cause of a cloudy product. On the other hand, a higher proportion of polyvinyl alcohol can be the cause of a reduction of the creep.

The emulsifying agent can be introduced at the same time as the other components. It can be mixed with the polyvinyl alcohol and fed into the reaction with the stream of polyvinyl alcohol, or all of the emulsifying agent, can be placed in the initial reaction medium.

The acid catalyst can be introduced at the same time as the other components. It can be mixed with the polyvinyl alcohol and fed to the reaction with the stream of polyvinyl alcohol, or a portion of the acid catalyst can be placed in the initial reaction medium.

Another advantage of the process according to the invention is that it does not require the cooling of the polyvinyl alcohol as is the case when the polyvinyl alcohol is placed wholly in the reactor.

The introduction of the various streams can take place over a period between about 30 and 120 minutes. When the addition is completed, the reaction mixture, whose temperature is raised slightly by exothermic reaction despite cooling, comes to a temperature of about 20° to 30° C., depending particularly on the speed of introduction of the reagents. The reaction mixture is preferably left for about 30 minutes at this temperature. The reaction mixture is then brought to a temperature of the order of 70° C. over a period of between 1 and 3 hours. The reaction mixture is kept at this temperature for about 1 hour before being neutralized, then cooled, washed and dried.

The initial reaction medium comprises between about 1/10 and ⅓ of all the reactive polyvinyl alcohol.

The acid catalyst can be introduced in admixture with the polyvinyl alcohol, or by a separate stream. The catalysts which can be used are those which are known for the manufacturing processes of polyvinyl butyral, for example, hydrochloric acid, sulfuric acid, or mixtures of these acids.

The emulsifying agent can also be introduced in admixture with the polyvinyl alcohol or can be placed partially or wholly into the initial reaction medium. The emulsifying agents which can be used are those commonly used in the art for the making of polyvinyl butyral, such as sodium dodecylbenzenesulfonate, lauryl sulfate, and other known emulsifiers.

The polyvinyl butyral resins obtained according to the invention can be plasticized with known plasticizers for polyvinyl butyral. Dialkyl adipates, mixed alkyl and alkylaryl adipates, and glycol carboxylic esters are some examples.

Plasticized polyvinyl butyral (PVB) is obtained by mixing the PVB resin with the plasticizer. The amount of plasticzizer can vary as a function of the properties desired for the plasticized PVB. The plasticizer is generally used in proportions such that the plasticizer content of the plasticized PVB is between about 10 and 65% by weight.

The mixing can be accomplished according to standard practice well known in the art. For example, the PVB resin can be placed in a mixer and the determined amount of plasticizer added gradually under stirring. The mixing can be carried out at ordinary temperatures and over a period of about 30 minutes, but also at higher temperatures. The method described in the publication of French Pat. No. 2,235,631 or the mixers described in the article that appeared in the magazine LES TECHNIQUES DE L'INGENIEUR (reference J 1930) can be used.

After mixing, a mass is obtained that can be extruded to make sheets having, for example, a thickness of 0.76 mm. These sheets are used as interlayers in laminated glass.

The properties of the polyvinyl butyral obtained are determined in the following manner:

Test For Compression Creep

For this test, a press with hot plates is used. A sample of polyvinyl butyral (PVB) sheet having a thickness of 0.76 mm is cut out in the shape of a disk 26 mm in diameter. The disk is placed between two sheets of glass 60×60 mm. The unit is placed between the plates of the press kept at 125° C. After 5 minutes of preheating without applying pressure, the composite is subjected, for 5 minutes, to a pressure of 10 bars. If D represents (to within 0.25 mm) the diameter of the pressed PVB disk, the creep is given by the formula:

$$F = \frac{D - 26}{26} \times 100$$

It is considered that, for the application of the PVB for making a laminated glass, the compression creep should at least be equal to 60%.

Pummel Test (Adhesion to the Sheets of Glass)

The samples of laminated glass used in this test and the following tests are prepared as follows:

A PVB sheet 0.76 mm thick is previously conditioned with moisture, placed between two sheets of glass 30.5×30.5×0.3 cm, the laminated glass is then placed under a pressure of 10 kg/cm$^2$ at 138° C. for 20 minutes. These samples are cut in two pieces of about 15×30.5 cm which are conditioned for 8 hours at −18° C. These parts are then set on a support inclined at 45° and struck with a hammer with a flat head of 0.450 kg until the glass is crushed. The test surface for a part is about 10×15 cm and the hammer blows are distributed over this entire surface. The amount of glass remaining stuck to the PVB sheet is compared to a scale of "Pummel" standards marked from 0 to 10.

The test is done on both faces of the laminated glass and the result is expressed, consequently, by two values of the Pummel scale, determined in the following manner:

| % of surface of the PVB sheet to which the glass is stuck during breaking | Pummel Values |
| --- | --- |
| 100 | 0 |
| 95 | 1 |
| 85 | 3 |
| 60 | 4 |
| 40 | 5 |
| 20 | 6 |
| 10 | 7 |
| 5 | 8 |
| 2 | 9 |
| 0 | 10 |

It is considered that laminated glass thus tested is acceptable if the two Pummel values obtained are greater than 5.

Ball Drop Test (Impact Resistance)

This test is performed with a steel ball weighing 5 British pounds (2.270 kg), that is made to fall in the central part of a plane sample of laminated glass, resting in a horizontal position on a wooden frame. The sample of the laminated glass is formed of two sheets of glass 30.5×30.5×0.3 cm and an interlayer 0.76 mm thick.

The samples are at a temperature of 21° C. (±2° C.) and the test is conducted at increasing free fall heights of the ball. The approximate height, expressed in feet, is determined as the height for which more than 90% of the samples tested resist the passage of the ball through the laminate.

This test is considered positive when this approximate height is greater than or equal to 17 feet (5.18 meters).

Test for Determining the Turbidity

The "cloudiness" (or "turbidity") of a transparent sheet is defined as being the percentage of the light flow passing through it which is deviated by an angle greater than 2.5 degrees.

The measurement of the turbidity is done according to the NF 54-111 standard (which largely agrees with the method A of the ASTM D 1002-61 standard).

For the applications of PVB for the manufacture of transparent laminated glass, turbidity values lower than or equal to 0.3%-0.4% are considered acceptable.

Boiling Test

Samples of laminated glass are prepared by interposing a plasticized PVB interlayer of 0.76 mm between two plates of glass 30.5×30.5×0.30 cm. These samples are placed in boiling water for two hours and then examined to detect a possible formation of bubbles or a translucent white strip at the periphery of the samples. The absence of the formation of bubbles or translucent white strips indicates that the laminate has successfully undergone the moisture resistance test.

Examples of polyvinyl butyral synthesis according to the invention and comparative examples are described below and their characteristics are tested according to the methods described above.

The first three examples show the influence of the initial reaction medium to obtain a clear product and a high creep.

EXAMPLE 1 (COMPARATIVE)

100 kg of a 10% aqueous solution of polyvinyl alcohol (PVA), 50 g of sodium dodecylbenzenesulfonate (DBS) as the emulsifying agent, and 135 g of hydrochloric acid having a density of 1.18 as the catalyst are added to a 500 liter reactor as the initial reaction medium. The initial reaction medium is maintained at 10° C. Over a period of 90 minutes, three separate streams, (1) 150 kg of a 10% PVA solution maintained at a temperature of 75° C., (2) 14.05 kg of butyraldehyde maintained at ordinary temperature, and (3) 206 g of hydrochloric acid having a density of 1.18 are simultaneously fed to the reactor.

An expansion of the reaction volume is observed two hours after the start of the reaction, then twenty minutes later the formation of a suspension is observed. The product is then maintained 30 minutes at the observed temperature, and gradually brought to 70° C. over a period of 75 minutes. The reaction mixture is kept at this temperature for an hour. It is then neutralized with 187 g of soda and the temperature is maintained for another hour. The polyvinyl butyral (PVB) is then cooled, washed several times and dried.

The PVB resin is then plasticized with 38 parts benzyl and octyl adipate (BOA) for 100 parts resin, then extruded in the shape of a sheet 0.76 mm thick.

The PVB sheet made from the resin has the following properties:

| Hydroxyl content | 21.9% |
|---|---|
| Creep | 54% |
| Ball Drop | 23 feet (7.0 m) |
| Pummel | 8 + 9 |
| Turbidity | 0.33 |

This example shows that too high a concentration of PVA in the initial reaction medium is bad for the creep.

EXAMPLE 2 (COMPARATIVE)

100 liters of water and 50 g of DBS are introduced into a 500 liter reactor as an initial reaction medium maintained at 10° C. In three separate streams, (1) 150 kg of a 10% PVA solution at a temperature of 75° C., (2) 9.2 kg of butyraldehyde, and (3) 206 g of hydrochloric acid with a density of 1.18 are then simultaneously added to the reactor over a period of 90 minutes. The reaction is left standing for 30 minutes at the observed temperature and the reaction is completed as described in Example 1, except that 112 g of soda are used for the neutralization. The resin, washed and dried, is then plasticized with 38 parts BOA for 100 parts of resin, and made into a sheet 0.76 mm thick. The sheet, when subjected to the above tests, had the following properties:

| Hydroxyl content | 15.3% |
|---|---|
| Creep | 71% |
| Ball Drop | 19 feet (5.8 m) |
| Pummel | 4 + 4 |
| Turbidity | 0.79 |

This example shows that in the absence of PVA at the bottom of the container, or in the initial reaction medium, the product exhibits a high turbidity.

EXAMPLE 3

50 liters of water, 50 kg of a 10% PVA aqueous solution, 50 g of DBS and 68 g of pure hydrochloric acid are introduced in a 500 liter reactor as an initial reaction medium. Three separate streams of (1) 150 kg of a 10% PVA solution maintained at 75° C. during the addition, (2) 11.9 kg of butyraldehyde, and (3) 206 g of hydrochloric acid are then simultaneously fed to the reactor over a period of 75 minutes. After addition, the temperature of the reaction mixture, constantly cooled, is about 20° C. The steps of Example 1 are then carried out to complete the operation; the neutralization being carried out with 150 g of soda.

The sheets obtained from the resin show the following properties:

| Hydroxyl content | 20.1% |
|---|---|
| Creep | 73% |
| Ball Drop | 21 feet (6.4 m) |
| Pummel | 4 + 6 |
| Turbidity | 0.29 |
| Granulometry | 100 to 400 microns |

This example, according to the invention, shows that a reactor "heel" containing an initial reaction medium of water and PVA in low proportions results in a product having a high creep and low turbidity.

The following examples show the influence of the temperature of the initial reaction medium for obtaining suitable products and also the independence of the temperature of the PVA solution that is added during the reaction.

EXAMPLE 4

50 liters of water, 50 kg of a 10% PVA aqueous solution and 30 g of DBS are added to a 500 liter reactor as an initial reaction medium. The initial reaction medium is maintained at 10° C. Three separate streams of (1) 150 kg of a 10% PVA solution maintained at 60° C. during the addition, (2) 8.25 kg of butyraldehyde, and (3) 206 g of hydrochloric acid are then simultaneously fed to the reactor over a period of 90 minutes. The remaining sequence of the reaction and sheet preparation is performed as in Example 1, the neutralization being carried out with 112 g of soda.

The properties of the sheet obtained are as follows:

| | |
|---|---|
| Hydroxyl content | 18.7% |
| Creep | 65% |
| Ball Drop | 20 feet (6.1 m) |
| Pummel | 8 + 9 |
| Turbidity | 0.30 |
| Granulometry | 100 to 400 microns |

EXAMPLE 5

Example 4 is repeated except that the temperature of the PVA solution stream is maintained at 50° C. during the addition to the initial reaction medium. The properties of the product obtained are as follows:

| | |
|---|---|
| Hydroxyl content | 19.3% |
| Creep | 71 |
| Ball Drop | 22 feet (6.7 m) |
| Pummel | 8 + 9 |
| Turbidity | 0.28 |
| Granulometry | 100 to 400 microns |

These Examples 4 and 5 show that the temperature of PVA solution stream that is added has no significant influence on the properties of the PVB obtained.

EXAMPLE 6

The reaction is carried out in the same way as set forth in Example 3, except that the temperature of the initial reaction medium is 20° C. and the temperature at the end of the introduction of the remaining reagents is about 34° C. despite the cooling of the reaction mixture.

The properties of the sheet obtained are as follows:

| | |
|---|---|
| Hydroxyl content | 20.9% |
| Creep | 67 |
| Ball Drop | 22 feet (6.7 m) |
| Pummel | 9 + 9 |
| Turbidity | 0.43 |
| Granulometry | 500–1000 microns |

EXAMPLE 7

The reaction is carried out under the same conditions as set forth in Example 6, except that the temperature of the initial reaction medium is about 40° C. and it reaches 50° C. at the end of the introduction of the remaining reagents.

The properties of the sheet obtained are as follows:

| | |
|---|---|
| Hydroxyl content | 18.1% |
| Creep | 69 |
| Ball Drop | 27 feet (5.2 m) |
| Pummel | 9 + 9 |
| Turbidity | 0.64 |
| Granulometry | 2000–5000 microns |

These Examples 6 and 7 show the influence of the temperature of the initial reactive medium on the granulometry. The grains obtained are increasingly larger with higher temperature, and they are less suitable for plasticizing. Further, the turbidity is high. The temperature of about 20° C. of the initial reaction medium can be considered as the maximum temperature limit making it possible to obtain an acceptable resin.

EXAMPLE 8

The reaction is carried out in the same way as set forth in Example 4, except that the temperature of the initial reaction medium is about 5° C. After introduction of the remaining reagents over a period of an hour, the temperature of the reaction mixture reaches 24° C.

The properties of the sheet obtained are as follows:

| | |
|---|---|
| Hydroxyl content | 14.2% |
| Creep | 67 |
| Ball Drop | 17 feet (5.2 m) |
| Pummel | 6 + 8 |
| Turbidity | 0.90 |
| Granulometry | 100–400 microns |

This Example shows that too low a temperature for the initial reaction medium leads to a high turbidity.

EXAMPLES 9 AND 10

The reaction is carried out in the same manner as set forth in Example 3, except that the sodium dodecylbenzenesulfonate (DBS) is replaced by another emulsifier, namely sodium lauryl sulfate. The amounts of lauryl sulfate used are 25 and 15 g, respectively. The properties of the sheets obtained are similar to those of Example 3.

EXAMPLE 11

The reaction is carried out in the same manner as set forth in Example 3, except that the plasticizer is modified by replacing the 38 parts of BOA with 38 parts of a mixture of BOA and di-n-hexyl adipate in a ratio of 70% by weight of BOA and 30% by weight of di-n-hexyl adipate.

The properties of the sheet obtained are similar to those of Example 3.

EXAMPLE 12

The reaction is carried out in the same manner as set forth in Example 3, except that 38 parts of triethylene glycol di-n-heptanoate are used as the plasticizer.

The properties of the sheet obtained are similar to those of Example 3.

I claim:

1. A process for making polyvinyl butyral-glass laminates which comprises: forming a sheet of polyvinyl butyral resin by providing an initial reaction medium of a mixture of water and a portion of polyvinyl alcohol to be reacted in an amount sufficient to allow stirring, maintaining the initial reaction medium containing between about 2.5 and 7.5% by weight of polyvinyl alcohol, maintaining the initial reaction medium initially at a temperature between about 5° and 20° C., simultaneously but separately introducing a stream of polyvinyl alcohol aqueous solution in an amount sufficient to provide the remaining amount of polyvinyl alcohol to be used in the reaction and a stream of butyraldehyde, maintaining the reaction at a temperature below about 40° C. during the simultaneously but separate introduction of the polyvinyl alcohol and butyraldehyde streams; plasticizing the resultant resin with a suitable plasticizer; extruding the plasticized resin into sheets; and interposing at least one sheet of the plasticized resin between two sheets of glass to form a laminate.

2. The process according to claim 1 in which the introduction of the stream of polyvinyl alcohol and butyraldehyde are introduced into the reaction vessel over a period of from about 30 to 120 minutes.

3. The process according to claim 1 in which the initial reaction mixture contains an amount of polyvinyl alcohol between 1/10 and ½ of all of the polyvinyl alcohol to be reacted.

4. The process according to claim 1 in which, at the end of the introduction of all of the polyvinyl alcohol solution and the butyraldehyde, the reaction mixture is maintained for about 30 minutes at the attained temperature, after which the reaction mixture is brought to a temperature of about 70° C. over a period of form 2 to 3 hours.

5. The process according to claim 1 which further comprises introducing an acid catalyst and an emulsifying agent before plasticizing the resin.

6. The process according to claim 5 in which at least a portion of the acid catalyst is introduced at the same time as the stream of butyraldehyde and polyvinyl alcohol.

7. The process according to claim 5 in which at least a portion of the acid catalyst is introduced in admixture with the stream of polyvinyl alcohol being added to the reaction.

8. The process according to claim 5 in which at least a portion of the emulsifying agent is introduced during the reaction at the same time as the stream polyvinyl alcohol and butyraldehyde.

9. The process according to claim 5 in which at least a portion of the emulsifying agent is introduced in admixture with the stream of polyvinyl alcohol during the reaction.

10. The process according to claim 5 in which the emulsifying agent is sodium dodecylbenzenesulfonate and/or lauryl sulfonate.

11. The process according to claim 5 in which the acid catalyst is hydrochloric acid, sulfuric acid or a mixture of these acids.

12. A process for making polyvinyl butyral-glass laminates which comprises forming a sheet of polyvinyl butyral resin by providing an initial reaction medium of a mixture of water and a portion of polyvinyl alcohol to be reacted in an amount sufficient to allow stirring, maintaining the initial reaction medium containing between about 2.5 and 7.5% by weight of polyvinyl alcohol, maintaining the initial reaction medium initially at a temperature between about 5° and 20° C., simultaneously but separately introducing a stream of polyvinyl alcohol aqueous solution in an amount sufficient to provide the remaining amount of polyvinyl alcohol to be used in the reaction and a stream of butyraldehyde, said polyvinyl alcohol stream including an emulsifying agent and an acid catalyst, maintaining the reaction at a temperature below about 40° during the simultaneously but separate introduction of the polyvinyl alcohol and butryaldehyde stream, plasticizing the resultant resin with a suitable plasticizer; extruding the plasticized resin into sheets; and interposing at least one sheet of the plasticized resin between two sheets of glass to form a laminate.

13. The process according to claim 12 in which the emulsifying agent is sodium dodecylbenzenesulfonate and/or lauryl sulfonate.

14. The process according to claim 12 in which, at the end of the introduction of all of the polyvinyl alcohol solution and the butyraldehyde, the reaction mixture is maintained for about 30 minutes at the attained temperature, after which the reaction mixture is brought to a temperature of about 70° C. over a period of form 2 to 3 hours.

15. The process according to claim 12 in which the acid catalyst is hydrochloric acid, sulfuric acid or a mixture of these acids.

16. A process for making polyvinyl butyral-glass laminates consisting essentially of: forming a sheet of polyvinyl butyral resin by providing an initial reaction medium of a mixture of water and a portion of polyvinyl alcohol to be reacted in an amount sufficient to allow stirring, maintaining the initial reaction medium containing between about 2.5 and 7.5% by weight of polyvinyl alcohol, maintaining the initial reaction medium initially at a temperature of between about 5° and 20° C., simultaneously but separately introducing a stream of polyvinyl alcohol aqueous solution in an amount sufficient to provide the remaining amount of polyvinyl alcohol to be used in the reaction and a stream of butyraldehyde, maintaining the reaction at a temperature below about 40° C. during the simultaneous but separate introduction of the polyvinyl alcohol and butyraldehyde streams; plasticizing the resultant resin with a suitable plasticizer; extruding the plasticized resin into sheets; and interposing at least one sheet of the plasticized resin between two sheets of glass to form a laminate.

17. A process for making polyvinyl butyral-glass laminates consisting essentially of: forming a sheet of polyvinyl butyral resin by providing an initial reaction medium of a mixture of water and a portion of polyvinyl alcohol to be reacted in an amount sufficient to allow stirring, maintaining the initial reaction medium containing between about 2.5 and 7.5% by weight of polyvinyl alcohol, maintaining the initial reaction medium initially at a temperature between about 5° and 20° C., simultaneously but separately introducing a stream of polyvinyl alcohol aqueous solution in an amount sufficient to provide the remaining amount of polyvinyl alcohol to be used in the reaction and a stream of butyraldehyde, said polyvinyl alcohol stream including an emulsifying agent and an acid catalyst, maintaining the reaction at a temperature below about 40° C. during the simultaneous but separate introduction of the polyvinyl alcohol and butyraldehyde streams, plasticizing the resultant resin with a suitable plasticizer; extruding the plasticized resin into sheets; and interposing at least one sheet of the plasticized resin between two sheets of glass to form a laminate.

* * * * *